United States Patent
Kim et al.

(10) Patent No.: US 11,593,167 B2
(45) Date of Patent: Feb. 28, 2023

(54) THREAD EMBEDDED CACHE MANAGEMENT

(71) Applicant: International Business Machines Corporation, Armonk, NY (US)

(72) Inventors: Changhoan Kim, Long Island City, NY (US); John A. Gunnels, Somers, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/407,361

(22) Filed: May 9, 2019

(65) Prior Publication Data

US 2020/0356411 A1  Nov. 12, 2020

(51) Int. Cl.
G06F 9/50 (2006.01)
G06F 9/30 (2018.01)
G06F 12/0815 (2016.01)

(52) U.S. Cl.
CPC ........ G06F 9/5016 (2013.01); G06F 9/30043 (2013.01); G06F 12/0815 (2013.01); *G06F 2212/62* (2013.01)

(58) Field of Classification Search
CPC .. G06F 9/5016; G06F 9/30043; G06F 9/5022; G06F 12/0815; G06F 12/12; G06F 12/126; G06F 12/127; G06F 12/0802; G06F 12/0888; G06F 2212/62; G06F 2212/601; G06F 2212/60
See application file for complete search history.

(56) References Cited

U.S. PATENT DOCUMENTS

| | | | | |
|---|---|---|---|---|
| 5,475,856 A | * | 12/1995 | Kogge | G06F 9/30189 712/20 |
| 5,701,432 A | * | 12/1997 | Wong | G06F 12/0842 711/130 |
| 6,243,788 B1 | | 6/2001 | Franke et al. | |
| 6,360,220 B1 | * | 3/2002 | Forin | G06F 16/9014 |
| 6,741,257 B1 | * | 5/2004 | Retika | G06F 3/14 345/558 |
| 6,966,494 B2 | | 11/2005 | Nuebling et al. | |
| 7,353,515 B1 | * | 4/2008 | Ton | G06F 9/52 718/100 |
| 8,898,401 B2 | | 11/2014 | Manovit et al. | |
| 9,239,795 B2 | | 1/2016 | Agarwal et al. | |
| 2002/0184618 A1 | * | 12/2002 | Bala | G06F 9/445 717/148 |
| 2007/0174598 A1 | * | 7/2007 | Thekkath | G06F 9/3004 712/234 |
| 2008/0082753 A1 | * | 4/2008 | Licht | G06F 9/3806 711/128 |

(Continued)

OTHER PUBLICATIONS

Bazilinskyy, P, Impact of Cache on Data-Sharing in Multi-Threaded Programmes, (Doctoral dissertation, National University of Ireland Maynooth), Jun. 2014, pp. 1-166.

(Continued)

*Primary Examiner* — Michael Krofcheck

(74) *Attorney, Agent, or Firm* — Daniel Morris; Otterstedt & Kammer PLLC

(57) ABSTRACT

Methods and systems for locking a cache line of a cache. A cache line is locked based on a count of a plurality of threads (Continued)

that access the cache line and maintained in the cache until all of the plurality of threads have loaded the cache line.

20 Claims, 6 Drawing Sheets

(56) References Cited

U.S. PATENT DOCUMENTS

| | | | | |
|---|---|---|---|---|
| 2009/0113131 A1* | 4/2009 | Cypher | ............... | G06F 12/0897 711/121 |
| 2011/0138129 A1* | 6/2011 | Krishna | ............... | G06F 12/0842 711/133 |
| 2013/0179624 A1* | 7/2013 | Lambert | ............. | G06F 12/0246 711/103 |
| 2014/0372731 A1* | 12/2014 | Nystad | .................. | G06F 9/3802 712/207 |
| 2016/0062791 A1* | 3/2016 | Cain, III | ............... | G06F 9/5016 711/136 |
| 2018/0253341 A1* | 9/2018 | Martin-Haas | ........... | G06F 9/526 |
| 2019/0102303 A1* | 4/2019 | Wang | .................. | G06F 12/0831 |
| 2019/0155736 A1* | 5/2019 | Hagersten | ............. | G06F 12/126 |

OTHER PUBLICATIONS

Hughes, C. et al.; , Accelerating Multi-Core Processor Design Space Evaluation Using Automatic Multi-Threaded Workload Synthesis, Workload Characterization, IISWC 2008. IEEE International Symposium on. IEEE, Oct. 2008, pp. 163-172.

Anonymous, Implementing Locks in a Shared-Memory Multiprocessor Using a Simplified Coherence Protocol, IP.com No. IPCOM000200052D, Electronic Publication Date: Sep. 24, 2010, pp. 1-6.

Anonymous, Method for Processing Atomic Operations on Data in Two or More Cache Lines, IP.com No. IPCOM000137914D, IP.com Electronic Publication Date: Jun. 29, 2006, pp. 1-5.

Anonymous, Method for TPT Cache-Line Locking in a Multi-Threaded HCA, IP.com No. IPCOM000011436D, IP.com Electronic Publication Date: Feb. 19, 2003, pp. 1-5.

Peter Mell, "The NIST Definition of Cloud Computing," Special Publication 800-145; Sep. 2011, pp. 1-7.

* cited by examiner

THREAD EMBEDDED CACHE MANAGEMENT

BACKGROUND

The present invention relates to the electrical, electronic and computer arts, and more specifically, to a mechanism for incorporating cache management into a thread.

Caches utilize hardware, firmware, and/or software components to store information such that the data may be accessed faster by a processor. In some instances, a multi-level configuration of caches is utilized, where each level has a cache(s) characterized by a particular access speed. The data in the cache is typically obtained from the processor, memory, or other storage resources and temporarily stored in the cache during periods where there is frequent access to the data. Typically, an attempt is first made to access data from the cache instead of the other storage resources due to the improved speed offered by the cache. If the data is not found in the cache (a cache miss), the data is obtained by the processor from the other storage resources. If the data is found in the cache (a cache hit), the data is retrieved from or written to the cache resulting in a quicker transaction and an overall improvement to system performance. It is often the case that multiple threads work on a same set of data in a cache. In particular, multiple threads often load from the same cache line into the registers of a thread. Management of the cache in such an environment can improve the overall performance gains provided by the cache.

SUMMARY

Principles of the invention provide techniques for incorporating cache management into a thread. In one aspect, an exemplary method includes the step of locking the cache line based on a count of a plurality of threads that access the cache line; and maintaining the cache line in the cache until all of the plurality of threads have loaded the cache line.

In one aspect, an exemplary non-transitory computer readable medium comprises computer executable instructions which when executed by a computer cause the computer to perform operations comprising locking the cache line based on a count of a plurality of threads that access the cache line; and maintaining the cache line in the cache until all of the plurality of threads have loaded the cache line.

In one aspect, an exemplary apparatus comprises a memory; and at least one processor, coupled to said memory, and operative to perform operations comprising: locking the cache line based on a count of a plurality of threads that access the cache line; and maintaining the cache line in the cache until all of the plurality of threads have loaded the cache line.

As used herein, "facilitating" an action includes performing the action, making the action easier, helping to carry the action out, or causing the action to be performed. Thus, by way of example and not limitation, instructions executing on one processor might facilitate an action carried out by instructions executing on a remote processor, by sending appropriate data or commands to cause or aid the action to be performed. For the avoidance of doubt, where an actor facilitates an action by other than performing the action, the action is nevertheless performed by some entity or combination of entities.

One or more embodiments of the invention or elements thereof can be implemented in the form of a computer program product including a computer readable storage medium with computer usable program code for performing the method steps indicated. Furthermore, one or more embodiments of the invention or elements thereof can be implemented in the form of a system (or apparatus) including a memory, and at least one processor that is coupled to the memory and operative to perform exemplary method steps. Yet further, in another aspect, one or more embodiments of the invention or elements thereof can be implemented in the form of means for carrying out one or more of the method steps described herein; the means can include (i) hardware module(s), (ii) software module(s) stored in a computer readable storage medium (or multiple such media) and implemented on a hardware processor, or (iii) a combination of (i) and (ii); any of (i)-(iii) implement the specific techniques set forth herein.

Techniques of the present invention can provide substantial beneficial technical effects. For example, one or more embodiments provide one or more of:

maintaining a cache line in some level or in a particular level of a cache until all threads are no longer using the cache line;

improved speed of execution;

reduced traffic through the memory hierarchy;

improved performance predictability; and lower power usage (arising from lower traffic through the memory hierarchy and a shorter run time to obtaining a solution).

These and other features and advantages of the present invention will become apparent from the following detailed description of illustrative embodiments thereof, which is to be read in connection with the accompanying drawings.

DETAILED DESCRIPTION

Figure 1:
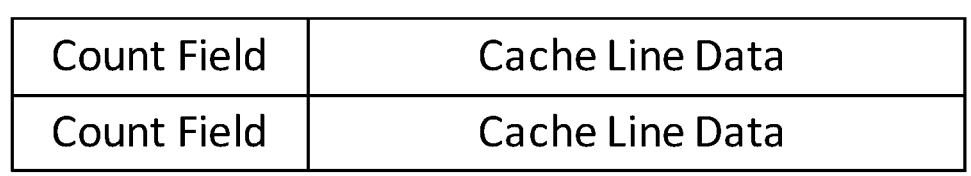
FIG. 1 is a block diagram of two cache lines of a first example cache, in accordance with an example embodiment.

Generally, a thread-incorporative lock/unlock mechanism is disclosed that maintains a cache line in the cache until the last thread that will utilize any data from the cache line finishes transferring a cache line, such as loading the cache line into its registers, storing data into the cache line, and the like. The cache line may be maintained until the last thread having access to the cache line transfers the data of the cache line. As used herein, threads include software threads, hardware, sockets, cores, nodelets, and the like. In one example embodiment, the cache line is locked and unlocked based on a count of the number of times the cache line is read, written to, or both; a count of the number of threads that touch (access) the cache line; a count of times a given thread accesses the cache line; and the like. In one example embodiment, each cache line is equipped with an extra set of bits that can be used as a counter, a set of touch bits, and the like.

It should be understood that a cache is a memory component that stores data, typically closer to a processor than other memory components or storage resources, to enable the data to be accessed faster and/or computationally less expensively by the processor. Stated another way, caching improves a computer's performance by keeping recent or often-used data items in memory locations that are faster or computationally cheaper to access than other memory stores. The memory components can be hardware-based, software-based, or both. When requested data is in the cache, it is designated a cache hit and the data (typically a cache line) is read from or written to the cache. Cache entries include both data and a corresponding memory location, known as the tag. When requested data is not in the cache, it is designated a cache miss. Since programs tend to access data in the same locality and often access the same data in a same time period, the cache can be relatively small in relation to the size of processor memory and other storage resources.

Smaller caches are typically associated with an increased number of cache misses, but faster access speeds; larger caches typically result in fewer cache misses, but generally slower access speeds. In view of the foregoing, architectures implement hierarchical caches known as cache levels. An L1 (level-1) cache is generally smaller and faster than an L2 cache, and so on. Typically, when a processor attempts to access data, it first checks one or more cache lines of the level L1 cache, depending on the architecture of the L1 cache. If one of the cache lines correspond to the requested data, the data is either retrieved from or stored to the cache line. If the data is not found in the L1 cache, a cache line is allocated by the L1 cache for the data and, for example, the data is copied into the cache line from the L2 cache or some other memory resource.

If a cache line is not available to allocate in the event of a cache miss, a cache replacement policy or cache replacement algorithm determines how the event is handled. Cache algorithms, or cache replacement algorithms/policies, are optimizing instructions, or algorithms, that a computer program or a hardware-maintained structure utilizes to manage a cache. When the cache is full, the algorithm typically chooses which data to discard to make room for new entries. For example, one of the occupied cache lines may be replaced with the new data in the event that a suitable cache entry is not available. In a fully associative cache, any cache line may be selected and, in a direct mapped cache, there is only one dedicated cache line that may be replaced. In an N-way set associative cache, there are N cache lines that may be used for a given memory location.

In one example embodiment, the extra set of bits is used as a counter. Each load or pre-fetch instruction has a count field which indicates how many times the cache line will be loaded into registers, stored into from registers, or both by all the threads and the set of counter bits is used to keep track of the number of accesses that have already been performed.

In a first example embodiment, an extra set of bits is configured as a counter for each thread that accesses the cache line, as described above. Each load or pre-fetch instruction has a count field which indicates how many times the cache line will be loaded into registers, data will be stored into the cache line, or both by a corresponding thread and each set of counter bits is used to keep track of the number of loads/transfers that have already been performed by a particular thread on a particular cache line. The extra set of bits consists of the ceiling of $\log_2(N^*) \times$ (Thread Count) where $N^*$ is the maximum number of cache touches that can be counted. Transfer of a cache line by a thread results in a decrement of the count field corresponding to the thread.

In a second example embodiment, an extra set of bits is configured as a counter for each set of threads, such as a pair of threads, that access the cache line. Each load or pre-fetch instruction has a count field which indicates how many times the cache line will be loaded into registers, data will be stored into the cache line, or both by either thread of a corresponding pair of threads and each set of counter bits is used to keep track of the number of loads/transfers that have already been performed by a particular pair of threads on a particular cache line. The extra set of bits consists of $\log_2(N^*) \times$ (Thread Count/2) where $N^*$ is the maximum number of cache touches that can be counted. Through the use of thread locking, a transfer of a cache line by a thread results in a decrement of the count field corresponding to the transferring thread.

In a third example embodiment, a single bit is configured for a cache line and a single thread is assigned to lock and unlock the cache line on behalf of all the threads that utilize the cache line.

In a fourth example embodiment, a single bit is configured for a cache line and a single thread is assigned to lock and unlock the cache line on behalf of all the threads that utilize the cache line. The assigned thread is designated by a thread identification field. The thread identification field may be implemented in: (1) a dedicated register; (2) software code (such as via a conditional statement: if(thread==designated)); (3) a bit-mask that is used with the counter decrement instruction (where use of the decrement instruction by a non-designated thread results in no decrement of the counter, and where use of the decrement instruction by the designated thread results in a decrement of the counter); (4) a special register, where the non-designated threads act as if they are locking and unlocking a line (such as setting and decrementing counters), but the hardware in charge of eviction only checks the section of the counter that corresponds to the designated threads; and (5) hard-wired identification (such as always designate thread 0).

In a fifth example embodiment, a single bit is configured for a cache line and any thread that utilizes the cache line is capable of locking the cache line. Only a single thread, however, is assigned to unlock the cache line on behalf of all the threads that utilize the cache line.

In a sixth example embodiment, an instruction is issued such that every load following the instruction sets the counter to a given value by the load or pre-fetch instruction. A two-step process is implemented: a first (immediate) instruction is used to load a count value into a special (designated) register or load a set of count values into a set of small general purpose registers. The loaded count values are then available for future use to load individual cache line counters. A second instruction then provides an index for identifying one of the registers from which to load the counter value, as opposed to carrying the counter value itself in the instruction (requiring a potentially large number of bits). In this embodiment, two bits can be used to index four registers, three bits can be used to index 8 registers, and so on. Thus, the instruction only carries the index for the registers, not the value of the count. The focus in this case is to reduce the instruction size, as is accomplished because the number of bits that needs to be encoded in the instruction is ceiling(log-2(count of count value registers)) and not the size of the count value registers themselves. For example, one might have eight 16-bit count-value registers. The instructions only need three extra bits to load one of eight values, instead of 16 extra bits to use these values as immediate values in an instruction. Thus, the size of the instruction set is not substantially increased. The value(s) in the registers can be swapped for different values, as needed, presumably with a lock/sync instruction so that no thread starts updating these values until all of the threads have used the current set of values.

In a seventh example embodiment, the first load instruction of a cache line sets the counter and locks the line. Later, a load or cache transfer by any thread will decrease the counter by one. Once the counter reaches zero, the line is unlocked automatically and ready for eviction, or even deliberately evicted.

This process may also be automated without any (repeated) special instructions in the user-code (a run-time solution). For example, a threshold can be set above which an accessed cache line will stay in the cache. In one example embodiment, a lower bound and upper bound on accesses are set. The types of accesses include, but are not limited to, (1) a load operation (loading data—e.g., single value, such as, an integer, double precision float, etc.—from memory and where the data is fed into a CPU from a cache miss or the data is fed into a CPU from a cache hit); (2) a store operation (a write to a register that goes into a cache, or multiple levels of a cache, depending on the write-back/write-through cache policy); (3) a cache touch (dcbt: an instruction that fetches data into the cache, but does not load it into a CPU register); and (4) a cache zero (dcbz: similar to a touch; the cache line is zeroed out). (Note that the cited load, store, dcbt, and dcbz do not actually include a cache specification; rather, they include a specification of a memory location, which is converted/translated by the cache mechanism to a particular cache line).

The bounds may be set for a single line or a set of lines. The lower-bound implies that any cache line that is accessed by a count of threads that equals or exceeds the lower bound value will remain cached until accessed by a count of threads that equals the upper-bound value, at which point the cache line will be subject to eviction or deliberately evicted.

In an eighth example embodiment, both the upper and lower bounds are set and decremented on each access, and a cache line is evicted if the lower count reaches zero and if there are no other compatible (given the set associativity of the cache) cache lines to evict.

In a ninth example embodiment, both the upper and lower bounds are set and decremented on each access, and a cache line with the lowest "upper" value is evicted if all lines are technically locked and a sensible candidate to evict is needed.

In a tenth example embodiment, the set of bits is configured as a touch bit set where each bit in the touch bit set corresponds to a particular thread. In this case, the number of bits matches the number of threads (there is one bit for each way in which a cache line is shared). The touch bit set is initialized such that a bit corresponding to a thread that will load or store the cache line is set and a bit corresponding to a thread that will not load or store the cache line is cleared. Once a thread loads the cache line into its loading register or stores data into the cache line, the corresponding bit is cleared. Thus, the line is locked when any bit in the touch bit set is set and the line is unlocked when all bits are cleared. In one example embodiment, the same approach is used at multiple cache layers and different cache layers may be shared among multiple threads, cores, nodelets, and the like.

In one example embodiment, each thread to access the cache line locks the cache line and then signs-off. The lock is established by setting the touch bit that is assigned to this thread and the thread signs-off by clearing the touch bit. When all the touch bits are cleared, the line is unlocked and ready for eviction. As long as a subsequent thread locks the line before all earlier threads sign off, the above scheme serves to maintain the line in the cache until the last thread finishes loading data from or storing data into the cache line. Otherwise, the first thread may lock the cache line on behalf of other threads as well as itself. In the latter case, a single thread may decrement a counter or clear a touch bit on behalf of one or more other threads. In the latter case, a single thread may set a counter and decrement a counter on behalf of one or more other threads, or may set and clear a touch bit on behalf of one or more other threads.

In one example embodiment, only one touch bit is used for a cache line. The lock is established by setting the touch bit. The touch bit may be set (locked) or cleared (unlocked) by any thread, or the touch bit may be set (locked) by any thread, but only cleared (unlocked) by a designated thread.

When all the touch bits are cleared, the line is unlocked and ready for eviction. As long as a subsequent thread locks the line before all earlier threads sign off, the above scheme serves to maintain the line in the cache until the last thread finishes loading data from or storing data into the cache line. Otherwise, the first thread may lock the cache line on behalf of other threads as well as itself. In the latter case, a single thread may decrement a counter or clear a touch bit on behalf of one or more other threads. In the latter case, a single thread may set a counter and decrement a counter on behalf of one or more other threads, or may set and clear a touch bit on behalf of one or more other threads.

In one example embodiment, a set of threads may decrement a counter or clear a touch bit on behalf of one or more other threads. For example, based on the address of the cache line, a first thread may decrement a counter or clear a touch bit if the last two bits of the address of the cache line are "00", a second thread may decrement a counter or clear a touch bit if the last two bits of the address are "01", a third thread may decrement a counter or clear a touch bit if the last two bits of the address are "10", and a fourth thread may decrement a counter or clear a touch bit if the last two bits of the address are "11".

Behavior

In one example embodiment, when there are no available cache lines (every line for a set is locked), the user is notified. For example, an interrupt may be generated to alert the user that a course of action to address the cache status is to be decided upon. By the time an interrupt calls a handler, however, the cache status has already changed, and the user may not have many options to mitigate the full cache. In one example embodiment, when there are no available cache lines, the user is notified after waiting a number of clock cycles. Thus, an interrupt is generated only after stalling one or more threads for some number of clock cycles.

In one example embodiment, when there are no available cache lines, a non-cacheable mode is run until a line is emptied. In one example embodiment, when there are no available cache lines, detect-correct scenarios are utilized. In one example embodiment (known as the detect-correct embodiment), an n-way set associative configuration is used where the cache is organized with m sets of cache lines, each set including n cache lines, and where a block of main memory is allowed to reside in any of the n cache lines of a particular set. (This would make parts of memory unreachable, but not all; alternatively, all lines are evicted, and all parts remain reachable.) After a single cache line is determined to be in this state, the set or way containing the subject cache line, for example, may be marked as ready for eviction in its entirety. For example, as defined by the cache replacement policy, it could be that there is no place in the cache at all, no place in the particular set. Therefore, an (assumed) forced reload will cause this (new) cache line to evict the set or way of one of the victim lines. (All counters are set to zero and all lines in the set or way are marked as evictable, not evicted.)

Alternatively, the locked line with the highest or lowest accessed count could be selected as the cache line to be evicted. Assuming that the target access count is accurate, the eviction of the cache line having the highest count is justified as this line will be brought into the cache the fewest (additional) number of times. If the user is assumed to have misjudged the future usage of the cache line, the eviction of the cache line having the lowest access count is justified as this line is not going to be accessed as many times as anticipated. In one example embodiment, a derived value, such as cycles-in-cache/accesses, is used; here, the line with the highest such derived value is selected for eviction.

In some environments, multiple threads work on a same set of data in a cache. In particular, these multiple threads can load from the same cache line into registers of the individual threads. If the architecture enables a user to lock a cache line in a designated level of the cache, there is a risk of running out of storage space at that level of the cache, effectively locking the entire cache. Two options for correcting such a lock include allowing the system to run with a designated level of the cache disabled (from any further cache operations) until an eviction takes place or providing a methodology for eviction. It should be understood that an eviction includes the release, unlocking, or flushing of the cache line. Allowing the system to run with a designated level of the cache disabled inherently means that the system has the capability to run without these lines being available for further cache operations (without inducing a system fault), yet not all systems have this capability.

FIG. 1 is a block diagram of two cache lines of a first example cache 100, in accordance with an example embodiment. Each cache line consists of a count field and a cache line data field. In one example embodiment, the count field is replaced with a touch bit field.

Model Instructions

In one example embodiment, a typical load/store instruction has the following format:

Load_or_Store Register_Number Memory_Address

In one example embodiment, there is a "Cartesian product" of a number of things:

1) an instruction that specifies the thread number or the hardware may infer the thread number. (In this case, a simpler hardware design would likely be possible if the instruction specified the thread number; however, compilers do not typically generate instructions with thread numbers in them.) For example:

Load Immediate-value <Optional: Thread Number> Register_Number Memory_Address where the immediate-value is the actual number of touches expected on that cache line (inclusion of the "Thread Number" is optional).

2) Instructions for count down operations:
a) a single load instruction (the "plain" load instruction) that always counts down (or attempts to). That is, the only special code generated is the instruction to set the counters, either "load_and_set_counter" or "plain" load.

b) Alternatively, two sets of instructions can be used: "plain loads," "load . . . ," and decrement loads "load-and-decrement-counter . . . "

c) Alternatively, one set of instructions can be used: "load-and-set immediate-value . . . " where a specific immediate value (such as all ones in the bit field) is treated as a decrement by one operation and all zeroes is treated as "just load, don't decrement."

3) Immediate values are used, a "regular register" number specified, or a "special register" number specified ("regular registers" are those holding integer values; "special registers" are a set of registers set up specifically to hold counter values and may contain fewer bits than the regular registers). In one example embodiment, instructions are defined for moving the data from one kind of register to another, from memory to either kind of register, or from an immediate instruction to either kind of register.

load-lock-use-an-immediate immediate-value target-register memory-address load-lock-use-general-register register-number target-register memory-address load-lock-use-special-register special-reg-number target-register memory-address For each of the above, each "load" instruction would have a corresponding "store" instruction.

In one example embodiment, the instructions include:

A) load/store-value immediate-value-to-set-counter target-register memory-address (loads or stores a value into a register and sets a cache line counter to the immediate value);

B) load/store-value special-register-to-set-counter target-register memory-address (loads or stores a value into a register and sets a cache line counter to the value in one of the set-up registers);

i) set-special-touch-counter-to touch-register-number immediate-value (used if there are a limited number of registers to hold touch counts (saving space in the touch-load instruction); the "touch-registers" can be implemented as a separate set of registers or can be implemented as the general purpose registers of the CPU; the contents may be loaded from memory (load-touch-register touch-register-number memory-address) or from a general purpose register (load-touch-register touch-register-number general-purpose-register-number));

C) load/store-value register-containing-touch-counter target-register memory-address (loads or stores a value into a register and sets a cache line counter to this immediate value; if the register-containing-touch-counter is a general purpose register: allows computation/inference of the number of touches that will be performed and then set up the cache line correspondingly);

D) the set-lock instructions do not load values, but set counters and are the same as (3) above, except there is no "target-register" because there is no load operation and the name is different:

lock-use-an-immediate immediate-value memory-address lock-use-general-register register-number memory-address lock-use-special-register special-reg-number memory-address (for each of the above, there is a single "unlock" instruction: unlock memory-address) In one example embodiment, the instruction includes the thread number (where the instruction is performed by the identified thread); the thread knows its identification number and updates the appropriate field(s) of the cache lines. In another embodiment, the code is compiled, "just in time" compiled, or interpreted on-the-fly with a specific thread number (or "all threads" designation) in the instruction. Thus, either only a specific thread can perform this instruction or any thread that performs the instruction treats the cache fields as if they corresponded to that thread (a mutual exclusion would disallow other threads from creating a conflict);

E) For the "set high and low" count initializations, for each of the above there is a corresponding load-high-and-low instruction where either the instruction fields are the same as the above with two immediate-values or register-numbers or special-register-numbers, or a single register number (for example, this may specify the low value and the system pulls in the next register to specify the high value). For E), it is noted this is not suitable for immediate values; with immediate values and as a variant for the others, there would be a variant instruction for each of the load/store- and lock_instructions above:

low-<rest of instruction>
(sets, loads, decrements, and the like for the low counter);
high-<rest of instruction>
(sets, loads, decrements, and the like for the high counter).

In one example embodiment, a special decrement instruction decrements both the low counter and the high counter.

In one example embodiment, a load instruction has the form:

load_value target_register immediate-value memory_address where immediate-value is the value of the counter, touch bits, and the like, target-register is the identification of the corresponding register into which the data at the memory address is loaded, and memory_address is the address corresponding to the cache line.

In one example embodiment, an unlock value instruction has the form:

Unlock_value_memory_address which is like load_lock_value useless_register 0. It sets the "retain" counter to zero.

Further load_values instructions use standard cache replacement policies.

Figure 2A:
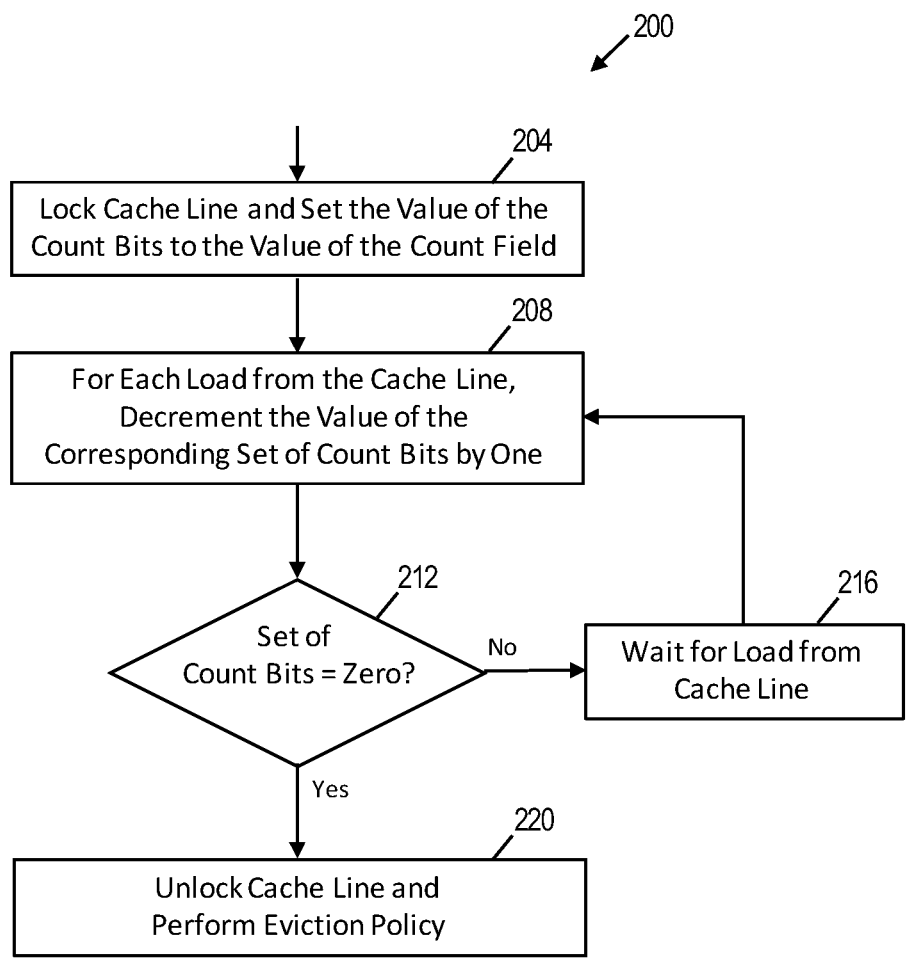
FIG. 2A is a flowchart of a first example method for managing a cache, in accordance with an example embodiment.

FIG. 2A is a flowchart of a first example method 200 for managing a cache, in accordance with an example embodiment. As described above, each load or pre-fetch instruction has a count field which indicates how many times the cache line will be loaded into registers or transferred by all the threads that utilize the cache line. In one example embodiment, a cache line is locked, and the corresponding set of count bits is set to the value of the count field of the load or pre-fetch instruction (operation 204). For each load from the cache line or storage to the cache line by one of the plurality of threads, the value of the corresponding set of count bits is decremented by one (operation 208). A test is performed to determine if the count of the corresponding set of count bits equals zero (operation 212). If the count of the corresponding set of count bits does not equal zero, the method 200 waits for the next load from the cache line to occur (operation 216) and then repeats operation 208; otherwise, the cache line is unlocked, and the eviction policy is performed (operation 220). For example, the cache line may be deliberately evicted, may be identified for eviction, and the like.

Figure 2B:
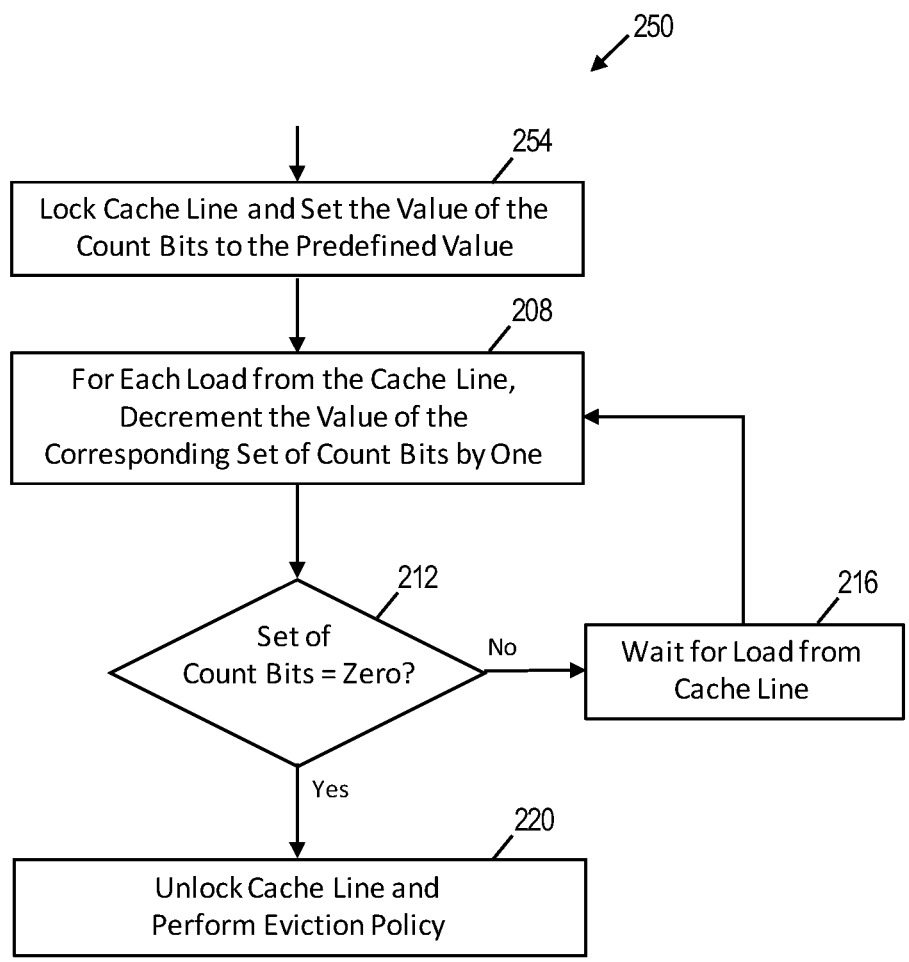
FIG. 2B is a flowchart of a second example method for managing a cache, in accordance with an example embodiment.

FIG. 2B is a flowchart of a second example method 250 for managing a cache, in accordance with an example embodiment. All operations of method 250 are equivalent to the operations of method 200 except that, in operation 254, the corresponding set of count bits is set to a predefined count instead of the value in the count field of a load or pre-fetch instruction.

Figure 3:
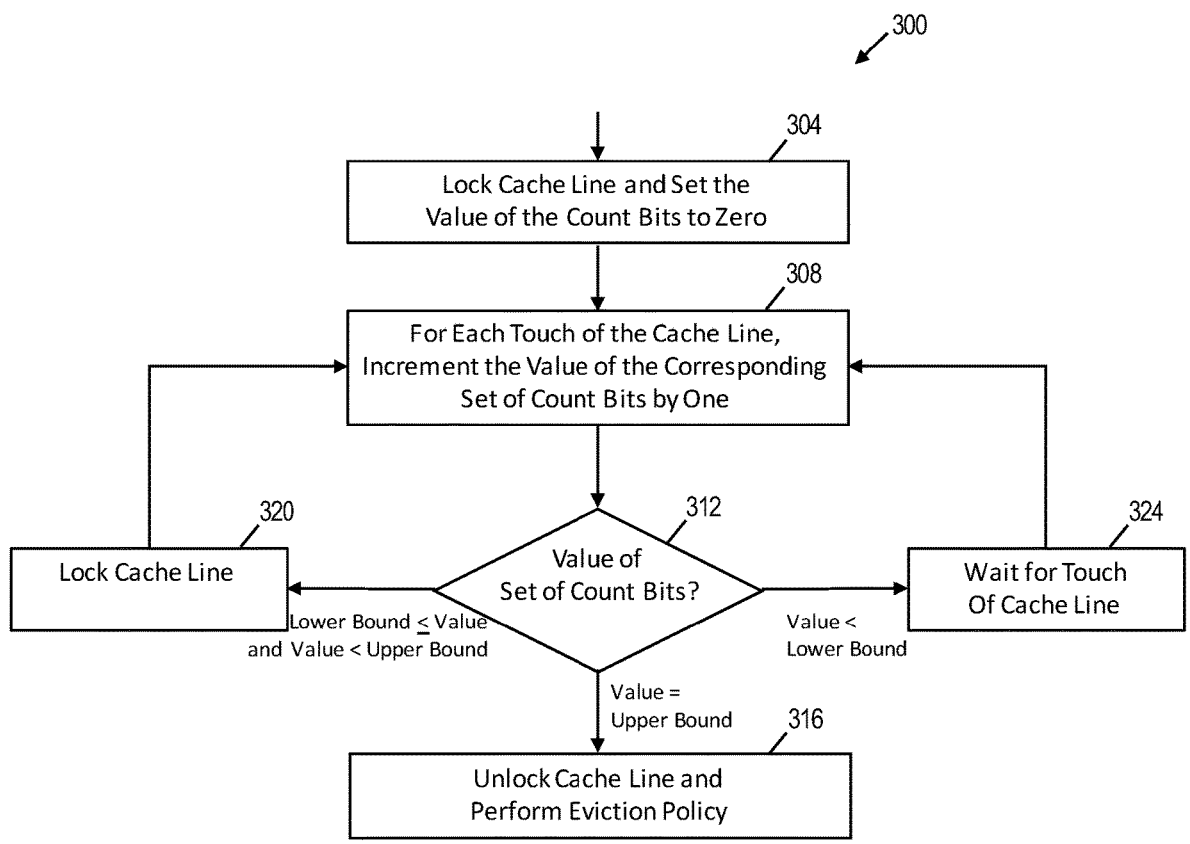
FIG. 3 is a flowchart of a third example method for managing a cache, in accordance with an example embodiment.

FIG. 3 is a flowchart of a third example method 300 for managing a cache, in accordance with an example embodiment. In one example embodiment, a cache line is locked, and the corresponding set of count bits is set to zero (operation 304). For each access of the cache line by one of the plurality of threads, the corresponding set of count bits is incremented by one (operation 208). A test is performed to determine if the count of the corresponding set of count bits is equal to or greater than a lower bound or equal to an upper bound (operation 312). If the count of the corresponding set of count bits is equal to or greater than the upper bound, the cache line is unlocked, and the eviction policy is performed (operation 316). For example, the cache line may be deliberately evicted, may be identified for eviction, and the like. If the count of the corresponding set of count bits is not equal to the upper bound and is equal to or greater than the lower bound, the cache line is locked (operation 320). Otherwise, the method 300 waits for the next access of the cache line to occur (operation 324) and then repeats operation 308.

Figure 4:
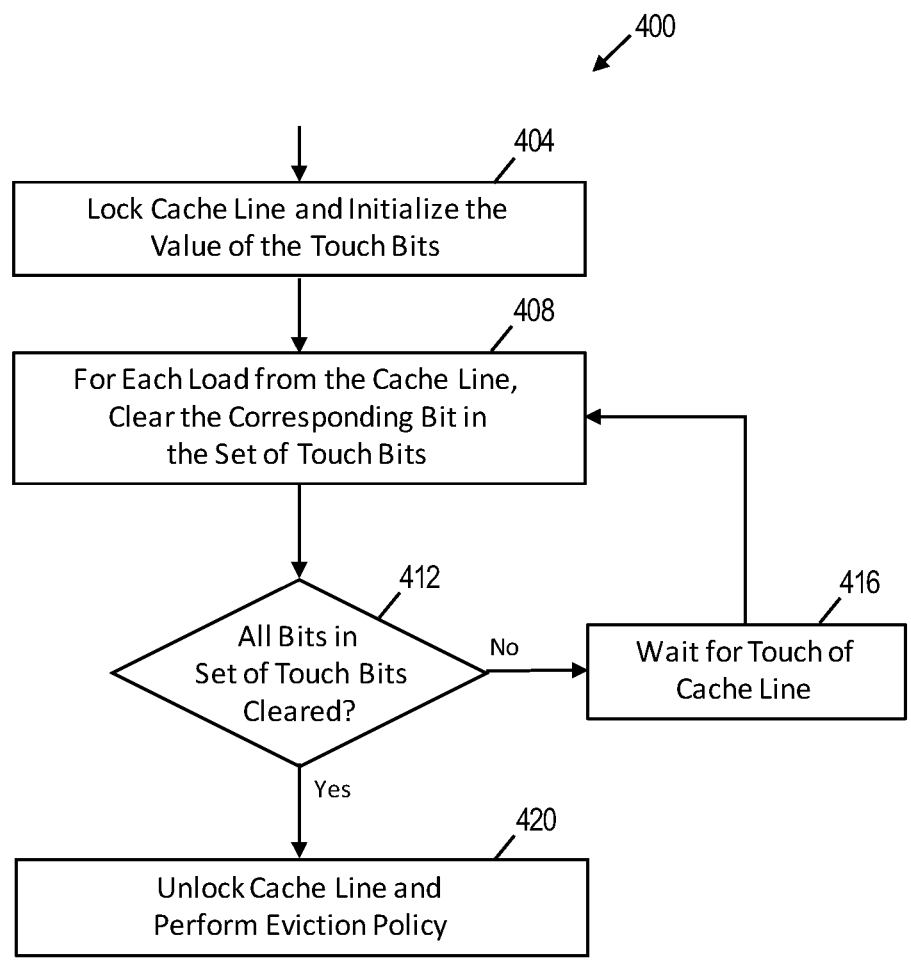
FIG. 4 is a flowchart of a fourth example method for managing a cache, in accordance with an example embodiment.

FIG. 4 is a flowchart of a fourth example method 400 for managing a cache, in accordance with an example embodiment. In one example embodiment, a cache line is locked, and the corresponding set of touch bits is initialized (operation 404). As described above, each bit in the touch bit set corresponds to a particular thread. The set of touch bits is initialized such that a bit corresponding to a thread that will load data from or store data to the cache line is set and a bit corresponding to a thread that will not load data from or store data to the cache line is cleared. For each thread that accesses the cache line, the corresponding bit in the set of touch bits is cleared (operation 408). In one example embodiment, the corresponding bit in the set of touch bits is cleared after the first load/store. In one example embodiment, the corresponding bit in the set of touch bits is cleared after the last load/store. A test is performed to determine if all the bits of the set of touch bits are cleared (operation 412). If all the bits of the set of touch bits are not cleared, the method 400 waits for the next access of the cache line to occur (operation 416) and then repeats operation 408; otherwise, the cache line is unlocked, and the eviction policy is performed (operation 420). For example, the cache line may be deliberately evicted, may be identified for eviction, and the like.

Given the discussion thus far, it will be appreciated that, in general terms, an exemplary method, according to an aspect of the invention, includes the step of locking the cache line based on a count of a plurality of threads that access the cache line; and maintaining the cache line in the cache until all of the plurality of threads have loaded the cache line.

In one example embodiment, the cache line is locked and unlocked based on a count of a number of times the cache line is accessed. In one example embodiment, each cache line is associated with a set of count bits. In one example embodiment, each load or pre-fetch instruction has a field which indicates a count of times the cache line will be loaded into one of a plurality of registers or data stored into the cache line by the plurality of threads.

In one example embodiment, the set of count bits is set to the count of times the cache line will be loaded into one of the plurality of registers or data stored into the cache line by the plurality of threads in response to execution of a first load instruction and wherein the locking is performed in response to execution of the first load instruction. In one example embodiment, the count maintained by the set of count bits is decremented in response to a thread of the plurality of threads loading data from the cache line into a register or storing data into the cache line. In one example embodiment, the cache line is unlocked in response to the count maintained by the set of count bits equaling zero. In one example embodiment, the cache line is evicted in response to the count maintained by the set of count bits equaling zero.

In one example embodiment, the locking is performed in response to the count maintained by the set of count bits exceeding a lower-bound threshold. In one example embodiment, the cache line is unlocked in response to the count maintained by the set of count bits equaling an upper-bound threshold. In one example embodiment, each cache line is associated with a set of touch bits. In one example embodiment, the locking is performed when any bit in the set of touch bits is set.

In one example embodiment, unlocking the cache line is unlocked when all bits in the set of touch bits are cleared. In one example embodiment, the set of count bits is set to a predefined value in response to execution of a first load instruction and wherein the locking is performed in response to execution of the first load instruction. In one example embodiment, a user is notified when every cache line in the cache is locked. In one example embodiment, a cache line having a highest or lowest touch count is unlocked in response to every cache line in the cache being locked. In one example embodiment, a cache line having a highest ratio of cycles-in-cache per touch is unlocked in response to every cache line in the cache being locked. In one example embodiment, one or more count registers are loaded using an immediate instruction and accessing the count registers using an index of another instruction.

In one example embodiment, a non-transitory computer readable medium comprises computer executable instructions which when executed by a computer cause the computer to perform operations comprising locking the cache line based on a count of a plurality of threads that access the cache line; and maintaining the cache line in the cache until all of the plurality of threads have loaded the cache line.

In one example embodiment, an apparatus comprises a memory and at least one processor, coupled to said memory, and operative to perform operations comprising locking the cache line based on a count of a plurality of threads that access the cache line; and maintaining the cache line in the cache until all of the plurality of threads have loaded the cache line.

Figure 5:
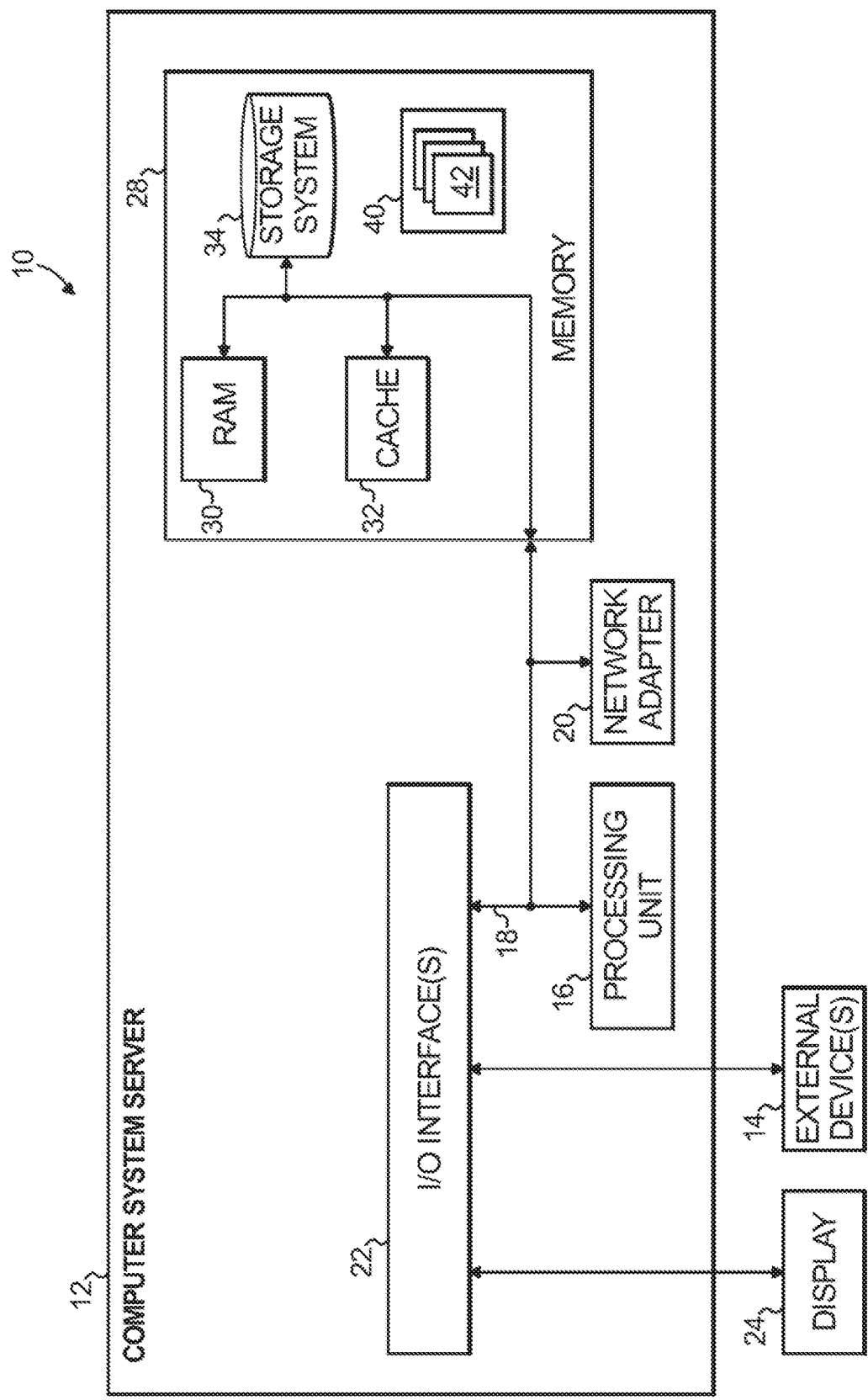
FIG. 5 depicts a computer system that may be useful in implementing one or more aspects and/or elements of the invention, also representative of a cloud computing node according to an embodiment of the present invention.

One or more embodiments of the invention, or elements thereof, can be implemented in the form of an apparatus including a memory and at least one processor that is coupled to the memory and operative to perform exemplary method steps. FIG. 5 depicts a computer system that may be useful in implementing one or more aspects and/or elements of the invention, also representative of a cloud computing node according to an embodiment of the present invention. Referring now to FIG. 5, cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 5, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, and external disk drive arrays, RAID systems, tape drives, and data archival storage systems, etc.

Thus, one or more embodiments can make use of software running on a general purpose computer or workstation. With reference to FIG. 5, such an implementation might employ, for example, a processor 16, a memory 28, and an input/output interface 22 to a display 24 and external device(s) 14 such as a keyboard, a pointing device, or the like. The term "processor" as used herein is intended to include any processing device, such as, for example, one that includes a CPU (central processing unit) and/or other forms of processing circuitry. Further, the term "processor" may refer to more than one individual processor. The term "memory" is intended to include memory associated with a processor or CPU, such as, for example, RAM (random access memory) 30, ROM (read only memory), a fixed memory device (for example, hard drive 34), a removable memory device (for example, diskette), a flash memory and the like. In addition, the phrase "input/output interface" as used herein, is intended to contemplate an interface to, for example, one or more mechanisms for inputting data to the processing unit (for example, mouse), and one or more mechanisms for providing results associated with the processing unit (for example, printer). The processor 16, memory 28, and input/output interface 22 can be interconnected, for example, via bus 18 as part of a data processing unit 12. Suitable interconnections, for example via bus 18, can also be provided to a network interface 20, such as a network card, which can be provided to interface with a computer network, and to a media interface, such as a diskette or CD-ROM drive, which can be provided to interface with suitable media.

Accordingly, computer software including instructions or code for performing the methodologies of the invention, as described herein, may be stored in one or more of the associated memory devices (for example, ROM, fixed or removable memory) and, when ready to be utilized, loaded in part or in whole (for example, into RAM) and implemented by a CPU. Such software could include, but is not limited to, firmware, resident software, microcode, and the like.

A data processing system suitable for storing and/or executing program code will include at least one processor 16 coupled directly or indirectly to memory elements 28 through a system bus 18. The memory elements can include local memory employed during actual implementation of the program code, bulk storage, and cache memories 32 which provide temporary storage of at least some program code in order to reduce the number of times code must be retrieved from bulk storage during implementation.

Input/output or I/O devices (including but not limited to keyboards, displays, pointing devices, and the like) can be coupled to the system either directly or through intervening I/O controllers.

Network adapters 20 may also be coupled to the system to enable the data processing system to become coupled to other data processing systems or remote printers or storage devices through intervening private or public networks. Modems, cable modem and Ethernet cards are just a few of the currently available types of network adapters.

As used herein, including the claims, a "server" includes a physical data processing system (for example, system 12 as shown in FIG. 5) running a server program. It will be understood that such a physical server may or may not include a display and keyboard.

It should be noted that any of the methods described herein can include an additional step of providing a system comprising distinct software modules embodied on a computer readable storage medium; the modules can include, for example, any or all of the appropriate elements depicted in the block diagrams and/or described herein; by way of example and not limitation, any one, some or all of the modules/blocks and or sub-modules/sub-blocks described. The method steps can then be carried out using the distinct software modules and/or sub-modules of the system, as described above, executing on one or more hardware processors such as 16. Further, a computer program product can include a computer-readable storage medium with code adapted to be implemented to carry out one or more method steps described herein, including the provision of the system with the distinct software modules.

Exemplary System and Article of Manufacture Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for locking a cache line of a cache, the method comprising:
   maintaining a set of count bits representing a plurality of counts of accesses of the cache line, each count of the plurality of counts of accesses corresponding to a thread of a plurality of threads that access the cache line;
   identifying, for decrementing, one of the plurality of counts of accesses in response to an access of the cache line by a thread of the plurality of threads;
   decrementing the identified count maintained by the set of count bits in response to the access of the cache line by the thread of the plurality of threads;
   locking the cache line based on the counts of accesses, the accesses performed by at least one of the plurality of threads that access the cache line; and
   maintaining the cache line in the cache based on the counts of accesses.

2. The method of claim 1, wherein the cache line is locked and unlocked based on the counts of accesses of the cache line.

3. The method of claim 1, wherein each cache line is associated with a corresponding set of the set of count bits.

4. The method of claim 3, wherein each load or pre-fetch instruction has a field which indicates a count of times the cache line will be loaded into one of a plurality of registers or data stored into the cache line by the plurality of threads.

5. The method of claim 4, further comprising setting the set of count bits to the count of times the cache line will be loaded into one of the plurality of registers or data stored into the cache line by the plurality of threads in response to execution of a first load instruction and wherein the locking is performed in response to execution of the first load instruction.

6. The method of claim 5, wherein the accessing the cache line is loading data from the cache line into a register or storing data into the cache line.

7. The method of claim 5, further comprising unlocking the cache line in response to the counts maintained by the set of count bits equaling zero.

8. The method of claim 5, further comprising evicting the cache line in response to the counts maintained by the set of count bits equaling zero.

9. The method of claim 3, wherein the locking is performed in response to the counts maintained by the set of count bits exceeding a lower-bound threshold.

10. The method of claim 9, further comprising unlocking the cache line in response to the counts maintained by the set of count bits equaling an upper-bound threshold.

11. The method of claim 1, wherein each cache line is associated with a set of touch bits.

12. The method of claim 11, wherein the locking is performed when any bit in the set of touch bits is set, wherein each bit of the set of touch bits corresponds to a different thread of the plurality of threads.

13. The method of claim 12, further comprising unlocking the cache line when all bits in the set of touch bits are cleared.

14. The method of claim 3, further comprising setting the set of count bits to a predefined value in response to execution of a first load instruction and wherein the locking is performed in response to execution of the first load instruction.

15. The method of claim 1, further comprising notifying a user when every cache line in the cache is locked.

16. The method of claim 1, unlocking a cache line having a highest or lowest touch count in response to every cache line in the cache being locked.

17. The method of claim 1, unlocking a cache line having a highest ratio of cycles-in-cache per touch in response to every cache line in the cache being locked.

18. The method of claim 1, further comprising loading one or more count registers using an immediate instruction and accessing the count registers using an index of another instruction.

19. A non-transitory computer readable medium comprising computer executable instructions which when executed by a computer cause the computer to perform operations comprising:
maintaining a set of count bits representing a plurality of counts of accesses of a cache line, each count of the plurality of count of accesses corresponding to a thread of a plurality of threads that access the cache line;
identifying, for decrementing, one of the plurality of counts of accesses in response to an access of the cache line by a thread of the plurality of threads;
decrementing the corresponding count maintained by the set of count bits in response to the access of the cache line by the thread of the plurality of threads;
locking the cache line based on the counts of accesses, the accesses performed by at least one of the plurality of threads that access the cache line; and
maintaining the cache line in the cache based on the counts of accesses.

20. An apparatus comprising:
a memory; and
at least one processor, coupled to said memory, and operative to perform operations comprising:
maintaining a set of count bits representing a plurality of counts of accesses of a cache line, each count of the plurality of count of accesses corresponding to a thread of a plurality of threads that access the cache line;
identifying, for decrementing, one of the plurality of counts of accesses in response to an access of the cache line by a thread of the plurality of threads;
decrementing the corresponding count maintained by the set of count bits in response to the access of the cache line by the thread of the plurality of threads;
locking the cache line based on the counts of accesses, the accesses performed by at least one of the plurality of threads that access the cache line; and
maintaining the cache line in the cache based on the counts of accesses.

* * * * *